United States Patent [19]

Boutet et al.

[11] 4,063,720
[45] Dec. 20, 1977

[54] AUTOMATIC UNPLUGGING ALUMINOTHERMIC WELDING CRUCIBLE

[76] Inventors: Camille Boutet, 68 rue Ordener, 75018 Paris; André Fevre, 105 rue de la Bruyere, 59230 Saint-Amand-Les-Eaux, both of France

[21] Appl. No.: 586,590

[22] Filed: June 13, 1975

Related U.S. Application Data

[63] Continuation of Ser. No. 449,336, March 8, 1974, abandoned.

[30] Foreign Application Priority Data

Mar. 23, 1973 France .............................. 73.10509

[51] Int. Cl.² ............................................ C21B 15/00
[52] U.S. Cl. ..................................... 266/167; 104/15
[58] Field of Search ................ 75/27; 104/15; 164/53, 164/54; 266/38, 39, 42, 167

[56] References Cited

U.S. PATENT DOCUMENTS

| | | | |
|---|---|---|---|
| 1,168,061 | 1/1916 | Deppeler | 75/27 X |
| 1,542,784 | 6/1925 | Deppeler | 266/167 X |
| 1,833,739 | 11/1931 | Davis | 266/236 |
| 1,880,242 | 10/1932 | Dickson | 266/167 |
| 1,883,755 | 10/1932 | Begtrup | 266/167 |
| 2,024,132 | 12/1935 | Sander | 75/27 |
| 3,050,409 | 8/1962 | Bayer | 75/27 X |
| 3,103,721 | 9/1963 | Bishop et al. | 164/53 |
| 3,831,915 | 8/1974 | Guntermann | 75/27 X |

FOREIGN PATENT DOCUMENTS 501,793  7/1930  Germany.

OTHER PUBLICATIONS

Publication: Feralite; 1923; published by Alumino-Thermic Corp.

*Primary Examiner*—Roy Lake
*Assistant Examiner*—Paul A. Bell
*Attorney, Agent, or Firm*—Stevens, Davis, Miller & Mosher

[57] ABSTRACT

The invention relates to an automatic unplugging aluminothermic welding crucible comprising a crucible per se made of refractory material, shaped generally as a truncated cone with a vertical axis, said cone tapering inwardly to the lower base thereof and comprising a conical hole receiving a crown provided with a conical bore, said conical bore receiving a casting socket, the conduit thereof being sealed by sealing means before filling of said crucible, said sealing means comprising a plug made of an aluminothermic compound consisting of iron oxide and aluminum agglomerated with a suitable binder, said plug resting on a steel washer.

According to the invention, said sealing means comprise a plug made of an aluminothermic compound consisting of iron oxide and aluminum agglomerated with a suitable binder, for example, made of silicate.

3 Claims, 1 Drawing Figure

U.S. Patent    Dec. 20, 1977    4,063,720
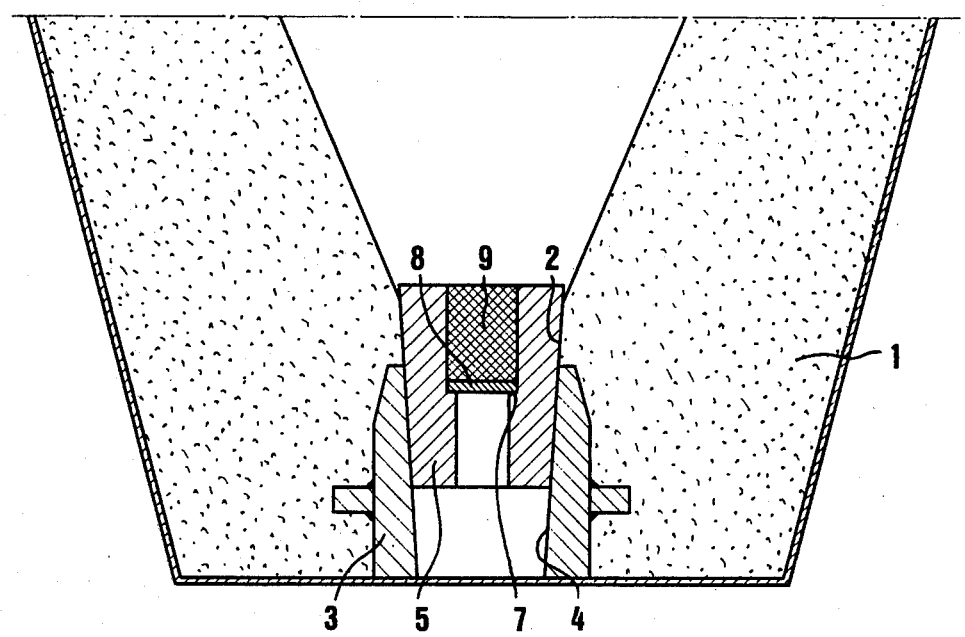

AUTOMATIC UNPLUGGING ALUMINOTHERMIC WELDING CRUCIBLE

This is a continuation of application Ser. No. 449,336, filed Mar. 8, 1974, now abandoned.

The invention relates to an automatic unplugging aluminothermic welding crucible.

Aluminothermic welding crucibles, designed, in particular for welding rails, are generally shaped as a truncated cone with a vertical axis, the larger base, opened, being located in the upper part thereof, and the smaller base, provided with a hole designed to allow the flow of melted metal, being located in the lower part therof. Said crucibles consist of a highly refractory material and provision is generally made at said lower base, which supports the greatest thermal effects of the aluminothermic reaction, for an extremely resistant crown, provided with a hole extending vertically therethrough and tapering inwardly in the downward direction, said hole receiving a socket through which the casting is made. Said sockets are rapidly destroyed by the melted metal and must be replaced in general, after five or six castings.

In known devices with manual unplugging, the casting hole is sealed with a metallic nail, the head thereof being protected by an asbestos washer covered with some magnesia in grain form. When the aluminothermic reaction is completed inside the crucible, the operator strikes the tip of the nail which projects outside the crucible to make the nail come up again and the melted metal flows into the mold located below said casting socket the conduit of which was unplugged as a result of lifting of the nail.

Various attempts have been made to replace this manual unplugging by an automatic unplugging operation. Thus, it has been suggested to replace said sealing nail by a metal washer, and, recently, by a fusible plug. In the case of a metal washer, the latter may melt very quickly, as soon as melted metal comes into contact therewith or, on the contrary, not quickly enough, which may cause solidification of part of the metal at the bottom of the crucible and clog it.

The fusible plugs commercially available of late generally give irregular and non reproducible results. Indeed, their melting results from the supply of a predetermined amount of heat. The amount of heat supplied to said fusible plug depends partly on the way in which the reaction proceeds, which is not always identical and subject to control. In addition, the products resulting from the melting of said plug must go through the steel bath and may dissolve at least partially therein and therefore contaminate it.

The object of the invention is to provide an automatic regular unplugging operation, whatever the way in which the aluminothermic reaction occurs may be, which is free of any risk of contamination of the steel bath. For this purpose, in an aluminothermic welding crucible of the type described, the sealing means consist of a plug formed from an aluminothermic compound consisting of iron oxide and aluminum agglomerated with a suitable binder, for example, made of silicate. Thus, the plug destruction time is perfectly determined as a function of its length and its destruction liberates products which can dissolve in the welding steel without exerting any harmful effect on its quality since these products are practically the same as those used in the crucible to form the welding steel.

In a preferred embodiment, the plug rests on a thin iron or steel washer, for example, approximately 1 mm thick, so that the effective unplugging of the socket hole takes place only after the destruction of the plug, i.e. without the possibility of the welding steel to drive away, under the effect of its weight, only part of the disintegrated plug.

The invention will be more clearly understood upon reading the following description with reference to the appended drawing in which the single FIGURE is an axial section schematic view of part of a crucible according to the invention before filling, in a particular embodiment.

The crucible 1, per se, made of a refractory material, such as magnesia, magnesia pise or corindon, is generally shaped as a truncated cone with a vertical axis, which tapers into a smaller downwardly facing base provided with a conical hole 2 which provides for communication between the inside of crucible 1 and the welding mold (not shown). The base of crucible 1, can receive a crown 3, made of highly resistant material comprising a truncated bore 4 which extends hole 2. Receivable within hole 2, and partially bore 4, there is provided a socket 5, made of a refractory material, such as magnesia or compressed sand. Socket 5 is provided with a bore 6 comprising a shoulder 7.

A steel washer 8 engages the shoulder 7 whereby sealing bore 6 and is stopped by a plug 9 formed from an aluminothermic compound consisting of iron oxide and aluminum agglomerated with a silicate based binder.

The destruction time for plug 9, and a result of the aluminothermic reaction inside crucible 1, with the pro-proviso of a constant particle size of the products used, a very intimate mixture of these products and strictly constant manufacturing conditions, depends solely on the length thereof from the moment at which melted metal comes into contact with the upper part of plug 9. After destruction of plug 9, the steel washer 8 melts itself in a set time which adds to the time required for the disintegration of plug 9. The destruction of plug 9, which is no longer a function of an amount of heat supplied, starts as soon as the first drops of melted metal come into contact therewith and the plug disintegrates by itself at a perfectly well determined rate. The time required for melting the steel washer being also perfectly well determined and constant, since the heat required for melting results from the reaction of plug 9 and from the steel inside the crucible which comes into contact therewith, as a mass, as a result of the fact that the reaction of the welding mixture is substantially completed, since it has occurred during the destruction of the plug, the total time required for umplugging of the casting hole is constant.

In addition, the products resulting from the melting of plug 9 and washer 8 are the same as those used in the production of the welding steel, whereby this welding steel is not contaminated by the melt products. The corindon resulting from the aluminothermic reaction is eliminated in a conventional manner, through gravity as it is produced.

What is claimed is:

1. In an aluminothermic welding crucible made of refractory material, shaped generally as a truncated cone with a vertical axis, said cone tapering inwardly to a lower base thereof and comprising a conical bore, a plugging means disposed within said conical bore for sealing the lower base of said crucible before it is filled, the improvement wherein said plugging means consists of a casting socket disposed in said bore and extending at least partially through said bore, said socket having a bore and a counterbore which join to form a shoulder facing the inside of the crucible; a metal washer disposed on the shoulder; and a plug made of iron oxide and aluminum agglomerated with a binder disposed in said bore in the socket means and resting on the washer, said plug being thermally destructible by melting within a predetermined time after molten welding material is added to the crucible.

2. An aluminothermic welding crucible having an inverted frusto-conically shaped refractory wall which encloses an inverted frusto-conically shaped chamber for melting metal, a first bore through the wall extending from the said chamber adjacent to its smallest cross-section to externally of the crucible, said first bore having an inverted frusto-conical shape, and means for sealing said first bore comprising a socket having a cross-section corresponding to that of said first bore disposed in the first bore, a second bore and a counterbore joining to provide an opening through the socket for flow of molten metal from the said chamber, said counterbore communicating with the chamber and being of larger cross-section than the second bore thereby joining the second bore to provide a shoulder which faces the chamber, a thin washer which will melt when contacted by said molten metal disposed on the shoulder, a plug made of iron oxide and aluminum agglomerated with a binder disposed on the washer and filling the counterbore above the washer, said plug having dimensions and composition whereby it melts within a predetermined time while in contact with said molten metal to unplug said counterbore, the composition of the washer being substantially the same as that of the said molten metal to avoid contamination thereof.

3. The crucible of claim 2 wherein said socket extends from the chamber only partially through the bore in the refractory wall and a liner which is resistant to the molten metal is disposed in the bore about at least a portion of the socket and to the external end of the bore in the refractory wall to protect the refractory wall from the molten metal.

* * * * *